United States Patent [19]

Teramachi

[11] 4,396,235
[45] Aug. 2, 1983

[54] ROLLER BEARING UNIT FOR GUIDING A LINEAR MOVEMENT AND METHOD OF MOUNTING THE SAME

[76] Inventor: Hiroshi Teramachi, 34-8, Higashi-Tamagawa 2-chome, Setagaya-ku, Tokyo, Japan, 158

[21] Appl. No.: 317,174

[22] Filed: Nov. 2, 1981

[51] Int. Cl.³ ............................................ F16C 29/06
[52] U.S. Cl. ............................................... 308/6 C
[58] Field of Search ................ 308/6 C, 4 R, 6 R, 6 B

[56] References Cited

U.S. PATENT DOCUMENTS

| | | | |
|---|---|---|---|
| 3,802,752 | 4/1974 | Koschmieder | 308/6 C |
| 4,293,166 | 10/1981 | Ernst et al. | 308/6 C |
| 4,302,059 | 11/1981 | Teramachi | 308/6 C |
| 4,352,526 | 10/1982 | Imai | 308/6 C |

Primary Examiner—Lenard A. Footland

Attorney, Agent, or Firm—George B. Oujevolk

[57] ABSTRACT

A new and unique roller bearing unit having a high load carrying capability is disclosed which essentially comprises a bearing unit body having a flat portion at the upper part and two projected portion at the lower part thereof with a considerably large groove formed therebetween, said flat portion having an upper non-loading roller groove and a lower loading roller groove and said projected portions having an outer non-loading stepped part and an inner loading stepped part, a track shaft adapted to be slidably fitted into said considerably large groove, an upper retainer firmly mounted on the flat portion for covering the nonloading rollers, side retainers firmly mounted on the projected portions for supporting the circulating rollers along the stepped parts, and a number of rollers adapted to circulate through the upper and lower roller grooves as well as along the outer and inner stepped parts.

9 Claims, 14 Drawing Figures

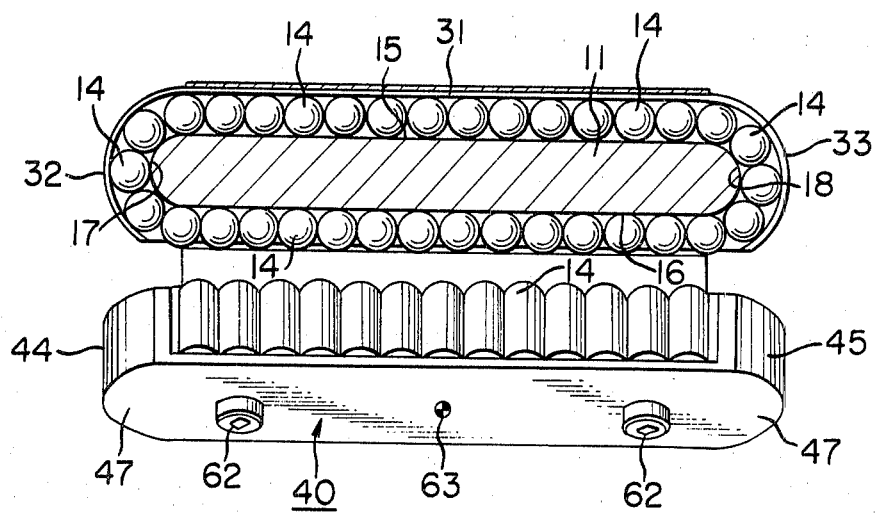
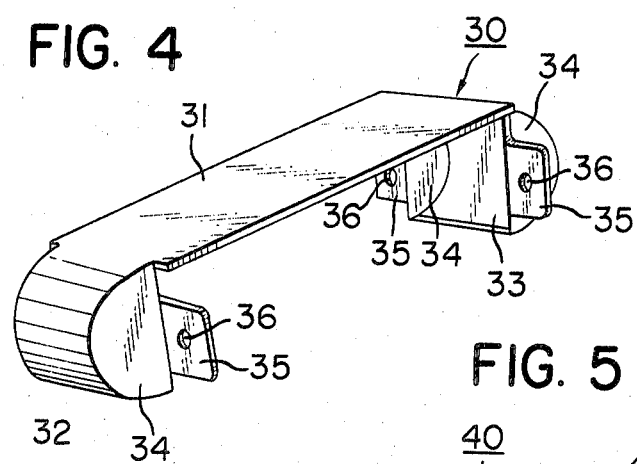
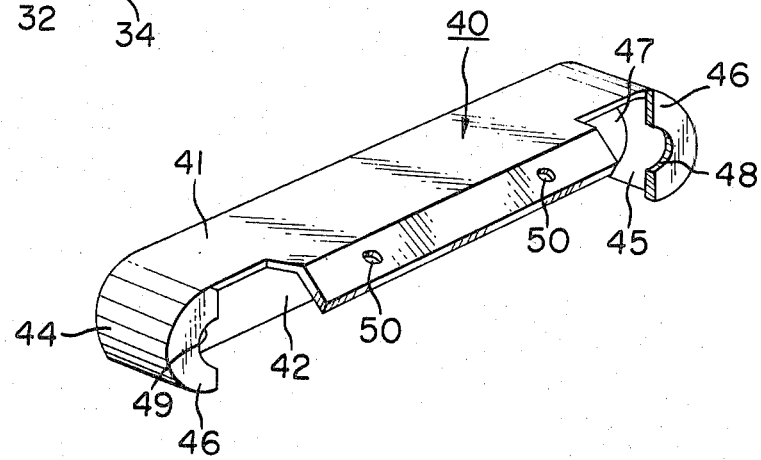

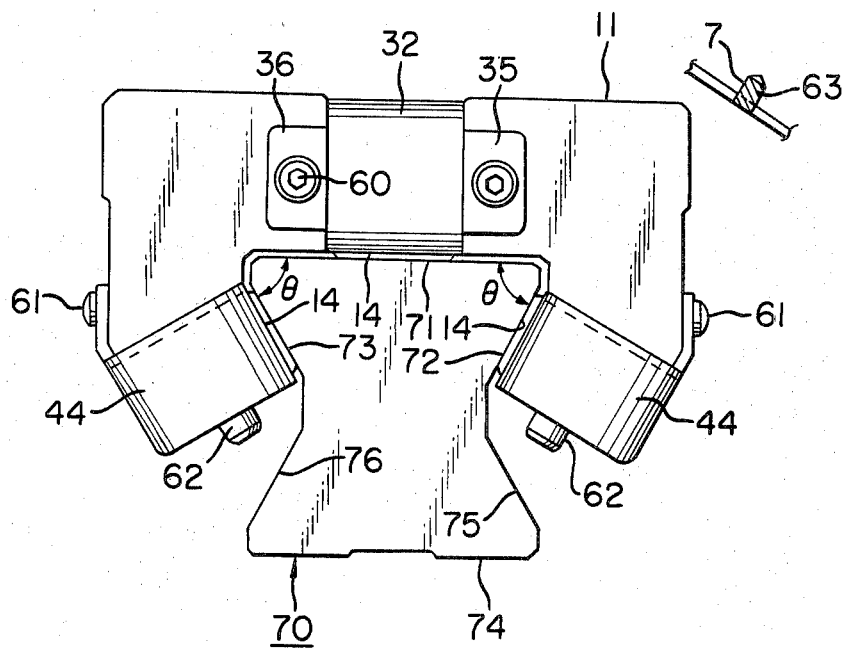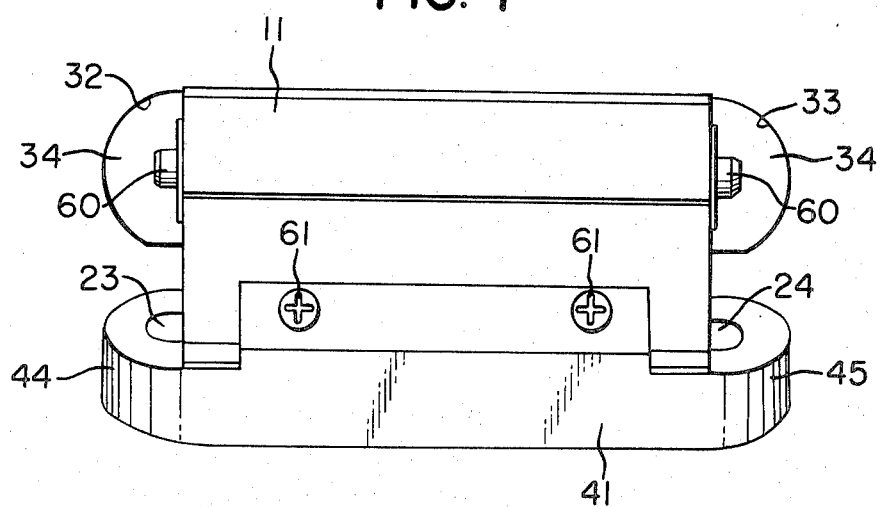

ROLLER BEARING UNIT FOR GUIDING A LINEAR MOVEMENT AND METHOD OF MOUNTING THE SAME

FIELD OF THE INVENTION

The present invention relates to a roller bearing unit with a long length of track shaft or rail slidably inserted therethrough which contains loading sections and non-loading sections so that high mechanical rigidity and excellent load carrying capability are ensured. More particularly, the present invention relates to a new and unique roller bearing unit very suitable for guiding a linear movement which has a substantially increased load carrying capacity against any vertical load owing to a number of rollers arranged side by side between a flat portion of a bearing unit body and the upper surface of the track shaft as well as against upwardly directed load (floating load) and lateral load, particularly moment load owing to a number of rollers arranged side by side between downwardly inclined projected portions of the bearing unit body and upper sliding surfaces of the track rail, said projected portions having an involving angle of about 60 degrees relative to the flat portion of the bearing unit body.

BACKGROUND OF THE INVENTION

It has been found that the hitherto known bearing unit has a high load carrying capacity against any vertical load as well as lateral thrust load owing to the arrangement of rollers or balls between the bearing unit body and the track shaft or rail at the upper side as well as at both the sides thereof but has a considerably reduced load carrying capacity against an upwardly directed load (floating load).

Further, it has been found that the conventional bearing unit has a reduced mechanical strength due to the fact that longitudinally extending holes are provided through the guide portions of the bearing unit body so that a number of rollers or balls are circulated therethrough.

Since the provision of the longitudinally extending holes through the bearing unit body requires difficult lathing and grinding operations, it represents one of factors which cause the conventional bearing unit to be manufactured at an expensive cost.

To obviate the drawbacks with the conventional bearing unit as described above an improved roller bearing unit with roller guide means incorporated therein for a moving body was proposed which comprises slide ways, guide brackets corresponding to the horizontal portion and inclined portions of said slide ways, said guide brackets being formed with a roller groove respectively, and a preloading mechanism arranged on the guide bracket (c.f. Japanese Utility Model Laid-Open No. 292/1971).

However, it was found that the proposed roller bearing unit has a drawback that sliding frictional resistance becomes increased as rolling friction increases in proportion to increase in applied load, because the rollers located in the non-loading sections are preloaded whereby they are tightly clamped between the retainers and the roller guide means.

SUMMARY OF THE INVENTION

Thus, it is an object of the present invention to provide a roller bearing unit for guiding a linear movement which has a high load carrying capability in all directions without any drawback inherent to the conventional roller bearing unit and of which rolling surfaces are very easy to be ground, wherein said roller bearing unit essentially comprises a bearing unit body having a flat portion with an upper non-loading roller groove and a lower loading roller groove as well as two inwardly inclined projected portion with an outer non-loading stepped part and an inner loading stepped part arranged in a symmetrical relation, said roller grooves and stepped parts being formed with curved end parts at both the front and rear ends thereof so as to ensure the circulation of rollers, a track shaft slidably inserted through an inverted trapezoidal groove provided in said bearing unit body, an upper roller retainer fixedly mounted on the flat portion of the bearing unit body, side roller retainers fixedly mounted on the respective inclined portions of the bearing unit body, and a number of rollers adapted to circulate through this upper and lower roller grooves as well as along the outer and inner stepped parts.

It is other object of the present invention to provide a method of mounting the above-described roller bearing unit on a machine table or the like with a moving member mounted thereon in such a manner that the bearing unit body is prestressed or preloaded by tightening a plurality of bolting means.

It is another object of the present invention to provide a roller bearing unit for guiding a linear movement which contains a bearing unit body as well as a track shaft or rail of which rolling surfaces are simple in form and thereby are easy to be ground and which contains retainers made of steel plate by press working without any difficulty whereby the whole roller bearing unit is manufactured at an inexpensove cost.

It is further another object of the present invention to provide a roller bearing unit for guiding a linear movement which contains a track shaft (rail) made of substantially square shape of section steel in a symmetrical configuration so that it has a high rigidity against twisting and bending moment, is easy to relieve stress caused by heat treatment and moreover has an excellent mechanical strength against possible deformation after finishing work.

It is still further another object of the present invention to provide a method of firmly mounting the above-described bearing unit on a machine table or the like in such a manner that the track shaft is fitted into a dovetail groove provided in the table and then it is fixed thereon with the aid of tightening bolts which are inserted and screwed in the lateral direction or from the above or from the bottom whereby a moving member slides smoothly on the upper sliding surface of the track shaft.

To satisfactorily accomplish the above objects of the present invention there is proposed in accordance with the invention a roller bearing unit for guiding a linear movement essentially comprising;

a bearing unit body having a flat portion at the upper part and two inwardly inclined projected portions located opposite to one another in a symmetrical relation at the lower part thereof with a longitudinally extending considerably large groove provided therebetween, said flat portion having an upper non-loading roller groove and a lower loading roller groove both of which longitudinally extend in parallel to one another for guiding the movement of rollers, while having curved end parts at both the front and rear ends of said roller grooves for ensuring the circulation of the rollers therethrough, and said inwardly inclined projected portions having stepped parts provided at both the outer non-loading and inner loading sides thereof both of which longitudinally extend in parallel to one another for guiding the movement of the rollers, while having curved end parts at both the front and rear ends of said stepped parts for ensuring the circulation of the rollers therealong, a track shaft having a substantially X-shaped cross-sectional configuration to be slidably inserted through said considerably large groove of the bearing unit body, said track shaft including three sliding surfaces comprising an upper sliding surface on which the loading rollers received in the lower roller groove of the flat portion of the bearing unit body are adapted to roll and both upper inclined sliding surfaces against which the loading rollers carried along the inner stepped parts of the projected portions of the same are adapted to roll, an upper roller retainer fixedly mounted on the flat portion of the bearing unit body for covering the non-loading rollers received in the upper roller groove thereof, side roller retainers fixedly mounted on the projected portions of the same for displaceably carrying the non-loading rollers along the outer stepped parts, and a number of rollers adapted to circulate through the roller grooves on the flat portion of the bearing unit body as well as along the inner and outer stepped parts of the projected portions of the same at both the sides thereof.

Further, there is proposed according to another aspect of the present invention to provide a method of firmly mounting a roller bearing unit on a machine table or the like with a moving member mounted thereon, said roller bearing unit essentially comprising a bearing unit body having a flat portion at the upper part and two inwardly inclined projected portions located opposite to one another in a symmetrical relation at the lower part thereof with a longitudinally extending considerably large groove provided therebetween, said flat portion having an upper non-loading roller groove and a lower loading roller groove for guiding the movement of rollers, while having curved end parts at both the front and rear ends of said roller grooves for ensuring the circulation of the rollers, and said inwardly inclined projected portions having an outer non-loading stepped part and an inner loading stepped part, while having curved end parts at both the front and rear ends thereof, a track shaft adapted to be slidably inserted through said considerably large groove in the bearing unit body, an upper roller retainer fixedly mounted on the flat portion of the bearing unit body for covering the non-loading rollers, side roller retainers fixedly mounted on the projected portions of the same for carrying the non-loading rollers along the outer stepped parts, and a number of rollers adapted to circulate through the upper and lower roller grooves as well as along the inner and outer stepped parts, wherein a plurality of threaded holes are provided outside the upper roller groove on the flat portion of the bearing unit body in a symmetrical relation so that a corresponding number of tightening bolts are screwed thereinto through drilled holes of the moving member in such a manner that among said tightening bolts outer ones are first screwed and then the residual inner ones are screwed more tightly than the former, whereby the bearing unit body is prestressed or preloaded.

Other objects and advantageous features of the present invention will be readily apparent from the reading of the following description with reference to the accompanied drawings which illustrate a few preferred embodiments of the present invention.

BRIEF DESCRIPTION OF THE ACCOMPANYING DRAWINGS

FIG. 3 is a sectional front view of the roller bearing unit taken in line A—A in FIG. 1, said roller bearing unit being shown with a track shaft removed therefrom.

FIG. 4 is a perspective view of an upper retainer for the roller bearing unit.

FIG. 5 is a perspective view of a left retainer for the roller bearing unit.

FIG. 6 is a side view of the roller bearing unit for guiding a linear movement.

FIG. 7 is a front view of the roller bearing unit with a track shaft removed therefrom.

DETAILED DESCRIPTION OF THE INVENTION

Figure 1:
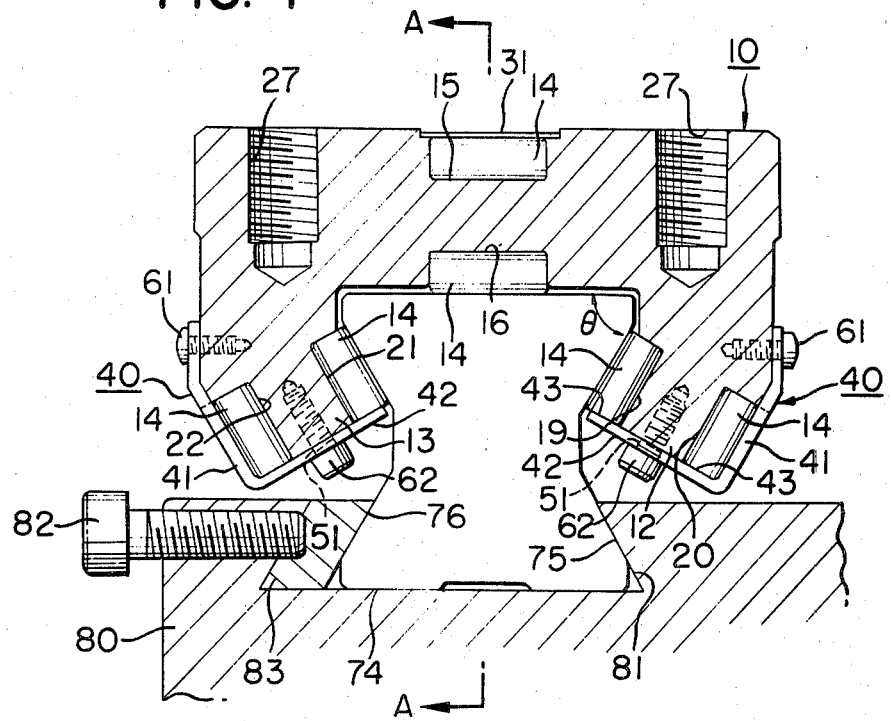
FIG. 1 is a cross-sectional side view of a roller bearing unit for guiding a linear sliding movement in accordance with the present invention, said roller bearing unit being shown as mounted on a part of a machine.

Now the present invention will be described in more details with reference to the accompanying drawings which illustrate a preferred embodiment of the present invention.

Reference numeral 10 designates a bearing unit body. The bearing unit body 10 is usually made of precision cast material, forged material or section steel and contains two projected portions 12 and 13 which are projected inwards at an inclination angle of about 60 degrees relative to a flat portion (horizontal portion) 11 in a symmetrical relation at the lower part of the bearing unit body 10, said projected portions 12 ans 13 being practically provided by machining an inverted truncated triangular groove along the center line of the bearing unit body at the bottom thereof. At both the upper non-loading side and lower loading side of the flat portion 11 of the bearing unit body 10 are provided U-shaped grooves 15 and 16 which extend in parallel to one another in the longitudinal direction, wherein said U-shaped groove 15 is dimensioned such that it has a depth appreciably more than the diameter of rollers 14, while said U-shaped groove 16 is dimensioned such that it has a depth appreciably less than the diameter of the rollers 14. Further, the flat portion 11 of the bearing unit body 10 has semi-circular end parts 17 and 18 at both the front and rear ends of the U-shaped grooves 15 and 16.

Figure 2:
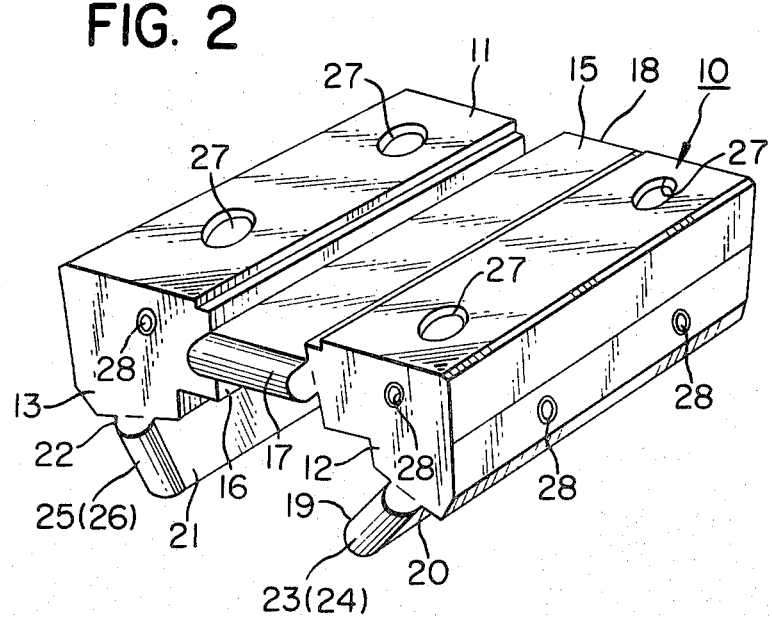
FIG. 2 is a perspective view of the roller bearing unit in FIG. 1.
Figure 8:
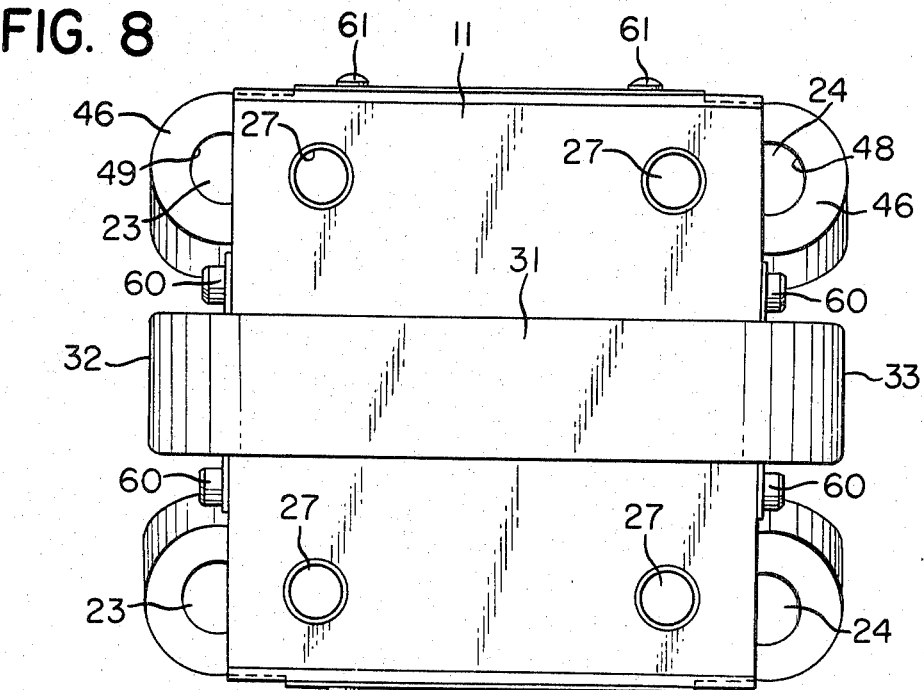
FIG. 8 is a plan view of the roller bearing unit with a track shaft removed therefrom.
Figure 9:
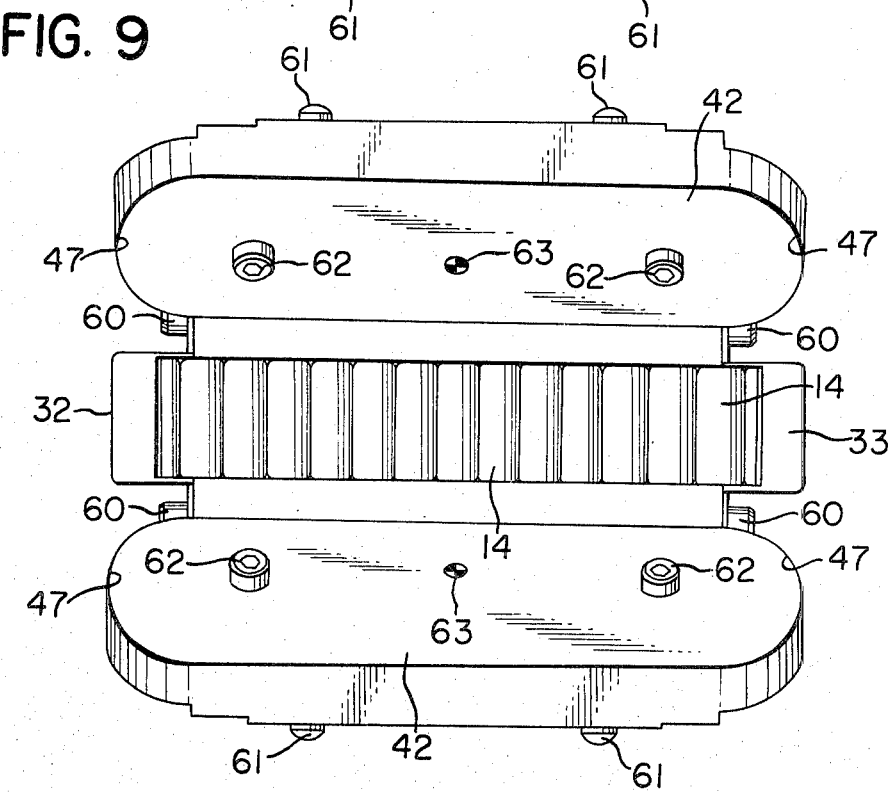
FIG. 9 is a bottom view of the roller bearing unit with a track shaft removed therefrom.

At both the inner loading side and outer loading side of the symmetrically inclined projected portions 12 and 13 are provided L-shaped and inverted L-shaped stepped parts 19, 20, 21 and 22 which extend in parallel to one another in the longitudinal direction, wherein the outer stepped parts 20 and 22 are dimensioned such that they have a depth appreciably more than the diameter of the rollers 14, while the inner stepped parts 19 and 21 are dimensioned such that they have a depth appreciably less than the diameter of the rollers 14. Further, it is to be noted that the outer stepped parts 20 and 22 as well as the inner stepped parts 19 and 21 have semi-circular end parts 23, 24, 25 and 26 at both the front and rear ends thereof (see FIG. 2).

Reference numeral 27 designates a threaded hole by means of which the bearing unit body 10 is secured to a moving member or a stationary means whereas reference numeral 28 does a threaded hole by means of which a retainer is secured to the bearing unit body 10.

Reference numeral 30 designates an upper retainer which is made of steel plate by press working, said upper retainer 30 comprising an upper cover plate 31 for covering the rollers 14 received in the U-shaped groove 15 at the non-loading side of the bearing unit body 10 and semi-circularly shaped guide parts 32 and 33 at both ends of said upper cover plate 31 (see FIG. 4).

Said semi-circularly shaped guide members 32 and 33 contain side plates 34 and flange plates 35.

Reference numeral 36 designates a drilled hole on the flange plate 35 through which a set screw is inserted.

Reference numeral 40 designates a retainer for the inclined projection 13 at the left side of the bearing unit body, which is made of steel plate by press working. Said retainer 40 comprises a side cover plate 41 for rotatably holding the non-loading rollers 14 and a L-shaped end plate 42 for supporting the end faces 43 of the respective rollers 14, said L-shaped end plate 42 extending toward the loading side of the inclined projection 13 at a right angle relative to said side cover plate 41. Further, the side cover plate 41 contains semi-circular guide members 44 and 45 at both the front and rear ends thereof. In addition, said semi-circular guide members 44 and 45 have both upper and lower side plates 46 and 47 integrally secured thereto, wherein the upper side plates 47 are formed with semi-circular cutouts 48 and 49 which have the configuration corresponding to the semi-circular end parts 23 of the inclined projection 13 (see FIGS. 1 and 4).

Reference numerals 50 and 51 designate a drilled hole respectively and specifically, the reference numeral 50 designates a drilled hole through which a set screw is inserted to firmly secure the retainer 40 to the side wall of the projected portion 13, while the reference numeral 51 does a drilled hole through which a set screw is inserted to firmly secure the retainer 40 to the bottom of the projected portion 13 (see FIG. 1).

Since the right retainer 40 is constructed in the same structure as that of the left retainer 40 which has been just described above and the same reference numerals are given to the same parts of the retainer, repeated description on the former will be omitted for the purpose of simplification.

Reference numeral 60 designates a bolt for fixedly securing the upper retainer 30 to the bearing unit body 10, reference numeral 61 does a set screw for fixedly securing the left and right retainer 40 to the side walls of the projected portions 12 and 13 of the bearing unit body 10, reference numeral 62 does a bolt for fixedly securing them to the bottom faces of the projected portions 12 and 13 and reference numeral 63 does a knock pin for exactly locating them at the bottom faces of the projected portions 12 and 13 (see FIGS. 6 to 9). Reference numeral 70 designates a track shaft which has a substantially X-shaped cross-sectional configuration and of which upper and lower surfaces extend in parallel to one another in the longitudinal direction. The upper surface 71 serves as a sliding surface on which the rollers 14 roll, whereas the upper downwards inclined surfaces 72 and 73 extend in parallel to the inclined projections 12 and 13 of the bearing unit body 10 in the longitudinal direction.

Thus, the involving angle between the upper surface 71 and the inclined surface 72 is about 60 degrees which is identical to that of the bearing unit body 10 (see FIG. 6).

Further, reference numeral 74 designates a bottom surface of the track shaft 70, whereas reference numerals 75 and 76 do a lower upwards inclined surface of the same respectively. It is to be noted that the track rail 70 is fitted into a dovetail groove 81 provided on a machine table 80 such that it is stationarily located in position in the groove 81 by squeezing a sleeve 83 by means of tightening bolts 82 in the lateral direction (see FIG. 1).

Figure 10:
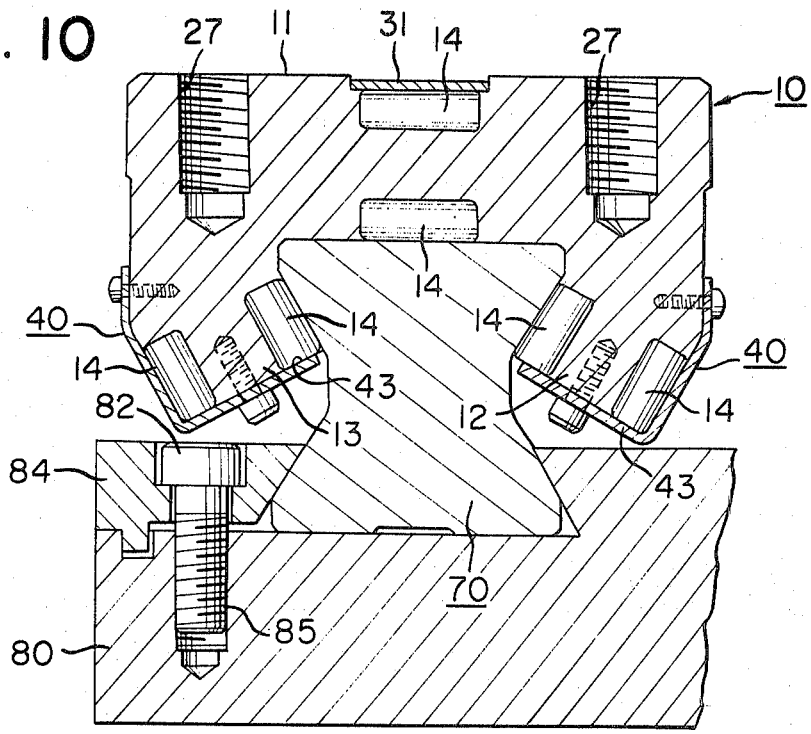
FIG. 10 is a cross-sectional side view of the roller bearing unit for guiding a linear movement, wherein it is mounted on a part of a machine in a different manner from FIG. 1.

FIG. 10 illustrates that the track rail 70 is firmly mounted on the machine table 80 in a different manner from that in the foregoing. Specifically, it is fixedly held on the table 80 by depressing a longitudinally displaceable sleeve 84 by means of bolts 82 which are screwed inti threaded holes 85 fromt the above.

Figure 11:
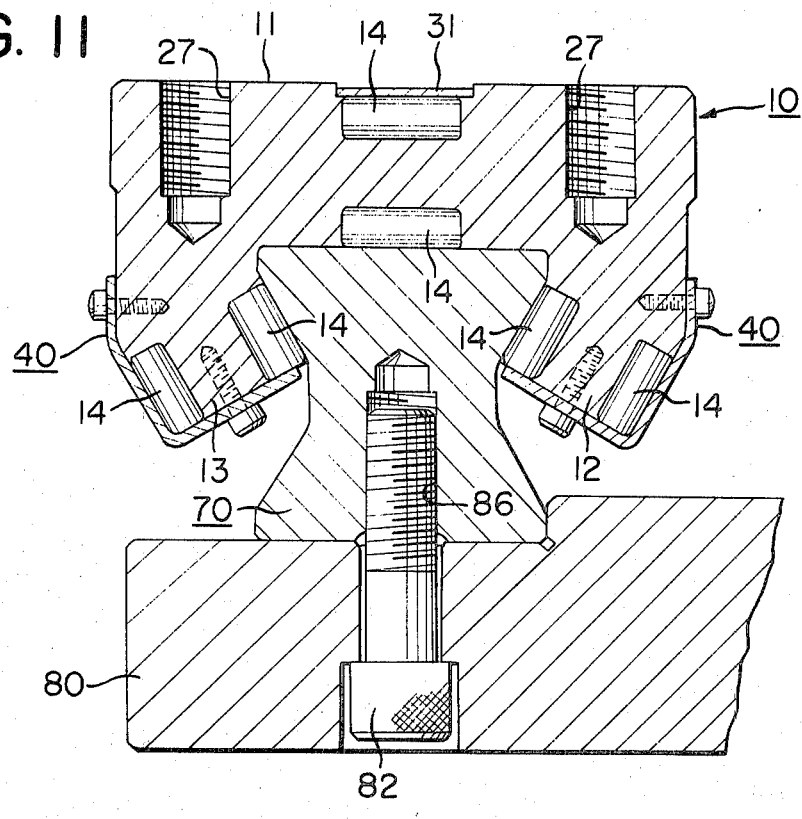
FIG. 11 is a cross-sectional side view of the roller bearing unit for guiding a linear movement, wherein it is mounted on a part of a machine in another different mamner from FIG. 1.

Further, FIG. 11 illustrates that the track rail 70 is firmly mounted on the machine table in another different manner. In this case, the track rail 70 is fixedly secured onto the table 80 by means of tightening bolts 82 which are screwed into threaded holes 86 in the track rail 70 from the bottom.

Now operation of the roller bearing unit of the invention will be described below.

First, a number of rollers 14 are charged through the U-shaped groove 15 at the non-loading side of the bearing unit body 10 as well as through the U-shaped groove 16 at the loading area between the upper surface 71 of the track shaft 70 and the bearing unit body 10. Then the upper retainer 30 is mounted on the bearing unit body and thereafter it is fixedly secured to both front and rear faces of the bearing unit body by means of the tightening bolts 60 which are screwed through the flange plates 35 (see FIG. 6).

Next, a predetermined number of rollers 14 are previously arranged side by side along the inner wall of the side cover 41 at the non-loading side of the retainer 40. While the retainer assembly is held at a predetermined distance from the projected portions 12 and 13, a number of rollers 14 are inserted through the open space between the inclined portions 12, 13 and the upper inclined surfaces of the track shaft 70 and then the L-shaped end plate 42 of the retainer 40 is raised up to come in contact against the bottom of the inclined portions 12 and 13. Finally, the retainer assembly is fixedly secured to the inclined portion of the bearing unit body by means of the bolts 62 and set screws 61, using the lock pin for ensuring exact locating therefor.

The linear guiding roller bearing unit as assembled in the above-described manner is fitted into the machine table 80, as illustrated in FIG. 1, and then is stationarily fixed by tightening the bolts 82.

Since the roller bearing unit of the invention is constructed and mounted in the above-described manner, the rollers between the flat portion of the bearing unit body and the upper surface of the track shaft serve to support any vertical load at a substantially increased capacity. On the other hand, as far as upwardly directed load (floating load), lateral load and moment load are concerned, other groups of rollers arranged between the inclined portions of the bearing unit body and the upper inclined surfaces of the track rail having an inclination angle of about 60 degrees are effective in satisfactorily carrying the above loads. Thus, an useful heavy load carrying type roller bearing unit has been provided in accordance with the present invention.

Since the rolling surfaces of the bearing unit body and track rail have a simple configuration which is easy to be machined and ground and moveover the retainers are made of steel plate by press working without difficulties, it is ensured that the roller bearing unit of the invention having an equidirectional load carrying capability is manufactured in a mass production line at an inexpensive cost without any substantial difficulty.

Further, since the track shaft or rail is designed in a substantially square section havng a lateral as well as a vertical symmetry, it has a high rigidity against twisting, bending moment and deformation after finishing and is easy to release stress caused by heat treatment.

It is to be noted that the track shaft or rail preferably should have no drilled hole or threaded hole for fixedly mounting it on a machine table or the like in order to ensure that it has a smooth upper sliding surface. To meet this requirement it is most recommendable that the machine table contains a dovetail groove which has the substantially same cross-sectional configuration as that of the lower part of the track shaft and it is firmly clamped in the lateral direction or from the above or from the bottom with the aid of bolting means.

Figure 12:
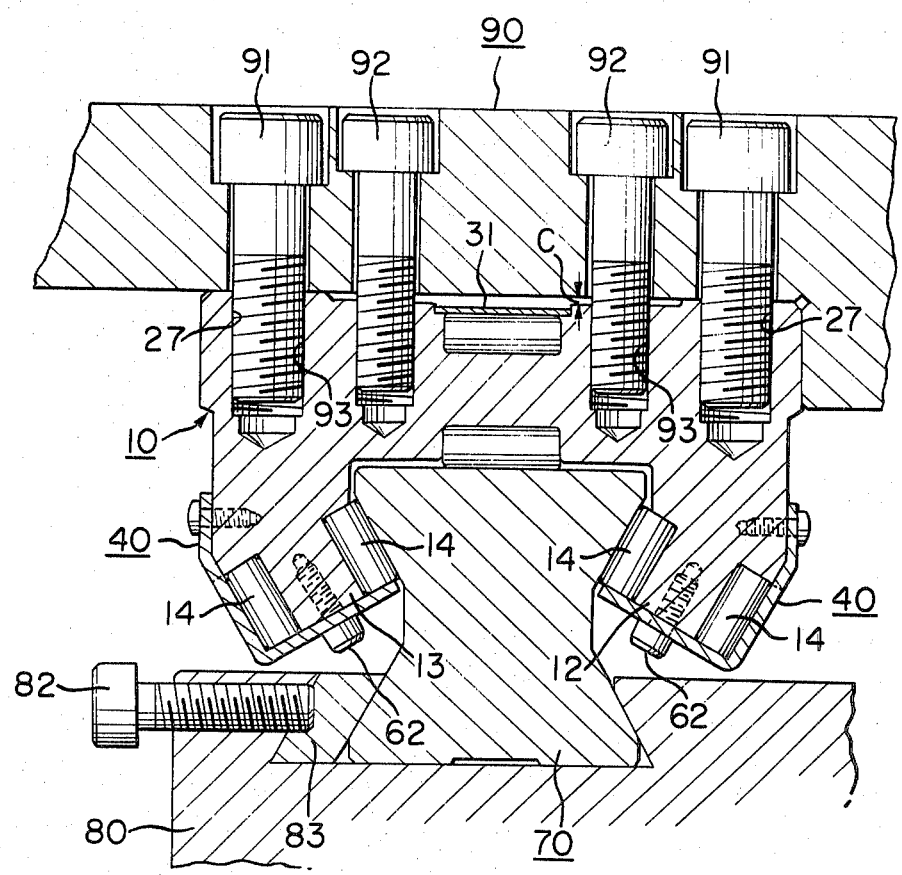
FIG. 12 is a cross-sectional side view of the roller bearing unit, wherein a preload is imparted to the bearing unit body.
Figure 13:
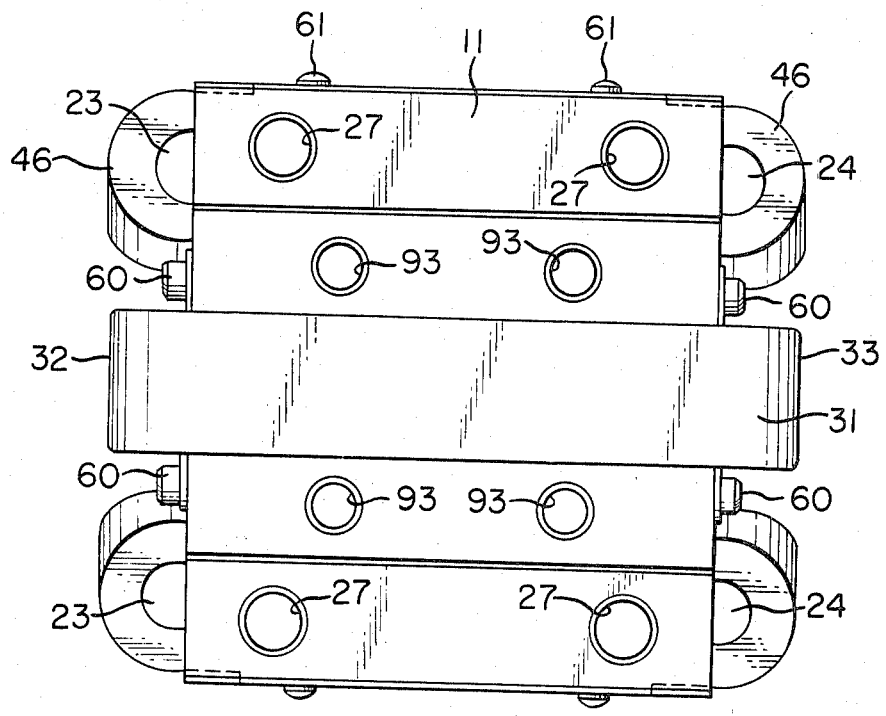
FIG. 13 is a plan view of the roller bearing unit in FIG. 12, said roller bearing unit being shown with a track rail and the associated movable components removed therefrom.
Figure 14:
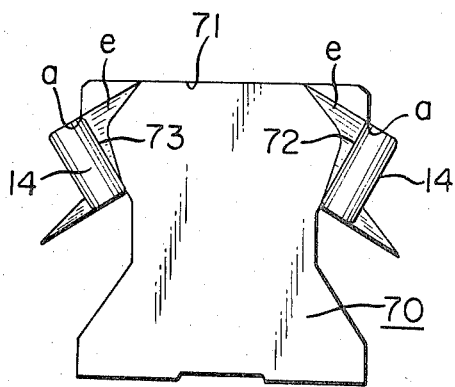
FIG. 14 is a side view of the track rail which schematically illustrates an edge load caused by the deformation of the bearing unit body.

As is apparent from FIG. 12, there is provided a clearance C between the bottom of a moving member 90 of a machine such as machine tool, industrial machine, transporting equipment or the like and the flat portion 11 of the bearing unit body 10, when it is mounted on the bearing unit. Thus, as an upward load (floating load) or preload is given to the bearing unit body 10, the projected portions 12 and 13 tend to expand outwards, whereby an edge load e is caused due to heavy contact between the upper part a of the rollers 14 and the upper inclined surfaces 72 and 73 (see FIG. 14), causing the sliding surfaces 72 and 73 and/or the rollers 14 to be damaged or injured.

In order to prevent an occurance of the edge load e it is preferable that the bearing unit body 10 is prestressed or preloaded with the aid of a plurality of tightening bolts 91 and 92 (four pieces of tightening bolts in case of the illustrated embodiment) which are inserted through the moving member 90 into the bearing unit body 10 from the above. To ensure prestressing or preloading a prulality of threaded holes 93 are provided in position inwards of the threaded holes 27 and in the vicinity of the central rollers 14 at an equal distance.

The bolts 91 and 92 are tightened by way of the following steps. First, to fixedly mount the moving member 90 onto the bearing unit body 10 the outer bolts 91 are tightened in a normal manner. Then, the inner bolts 92 are firmly screwed into the threaded holes 93 in the bearing unit body 10.

As will be readily understood from FIG. 12, the middle part of the flat portion of the bearing unit body 10 is raised up toward the movable member 90, when the inner bolts are more tightly screwed thereinto than the outer bolts. As a result, the upper part of the bearing unit portion 10 becomes convexly deformed whereby the rollers located at the loading side of the projected portions 12 and 13 are brought in uniform contact with the upper inclined sliding surfaces 72 ans 73 of the track shaft 70. Thus, it is ensured that the bearing unit of the invention satisfactorily stands against any floating load, while achieving an increased rigidity and running life.

It should be of cource understood that the number of the tightening bolts 91 and 92 depend on the dimensions of the bearing unit body 10 and movable member 90, loading capacity and others.

What is claimed is:

1. A roller bearing unit for guiding a linear movement essentially comprising;

a bearing unit body having a flat portion at the upper part and two inwardly inclined projected portions located opposite to one another in a symmetrical relation at the lower part thereof with a longitudinally extending considerably large groove provided therebetween, said flat portion having an upper non-loading roller groove and a lower loading roller groove both of which longitudinally extend in parallel to one another for guiding the movement of rollers, while having curved end parts at both the front and rear ends of said roller grooves for ensuring the circulation of the rollers therethrough, and said inwardly inclined projected portions having stepped parts provided at both the outer non-loading and inner loading sides thereof both of which longitudinally extend in parallel to one another for guiding the movement of the rollers, while having curved end parts at both the front and rear ends of said stepped parts for ensuring the circulation of the rollers therealong, a track shaft having a substantially X-shaped cross-sectional configuration to be slidably fitted into said considerably large groove of the bearing unit body, said track shaft containing three sliding surfaces comprising an upper sliding surface on which the loading rollers received in the lower roller groove of the flat portion of the bearing unit body are adapted to roll and both upper inclined sliding surfaces against which the loading rollers carried along the inner stepped parts of the projected portions of the same are adapted to roll, an upper retainer fixedly mounted on the flat portion of the bearing unit body for covering the non-loading rollers received in the upper roller groove thereof, side retainers fixedly mounted on the projected portions of the same for displaceably carrying the non-loading rollers along the outer stepped parts, and a number of rollers adapted to circulate through the roller grooves of the flat portion of the bearing unit body as well as along the inner and outer stepped parts of the projected portions of the same at both the sides thereof.

2. A roller bearing unit for guiding a linear movement as defined in claim 1, wherein said longitudinally extending considerably large groove has a substantially inverted trapezoid cross-sectional configuration.

3. A roller bearing unit for guiding a linear movement as defined in claim 1, wherein said upper and lower roller grooves on the flat portion of the bearing unit body have a substantially U-shaped cross-sectional configuration and the lower roller groove has a depth appreciably less than that of the upper roller groove.

4. A roller bearing unit for guiding a linear movement as defined in claim 1, wherein said curved end parts at both front and rear ends of the upper and lower roller grooves as well as at the front and rear ends of the inner and outer stepped parts are shaped in a semi-circular sectional configuration.

5. A roller bearing unit for guiding a linear movement as defined in claim 1, wherein said stepped parts of the symmetrically disposed projected portions of the bearing unit body has a substantially L-shaped cross-sectional configuration.

6. A roller bearing unit for guiding a linear movement as defined in claim 1, wherein said upper retainer contains an upper cover plate which is integrally formed with semi-circular guide members at both the ends thereof.

7. A roller bearing unit for guiding a linear movement as defined in claim 1, wherein said side retainers contain a side cover plate having a substantially L-shaped cross-sectional configuration which is integrally formed with semi-circular guide members at both the ends thereof.

8. A method of mounting a roller bearing unit on a machine table with a moving member mounted thereon, said roller bearing unit essentially comprising a bearing unit body having a flat portion at the upper part and two inwardly inclined projected portions located opposite to one another in a symmetrical relation at the lower part thereof with a longitudinally extending considerably large groove provided therebetwee, said flat portion having an upper non-loading roller groove and a lower loading roller groove for guiding the movement of rollers, while having curved end parts at both the front and rear ends of said roller grooves for ensuring the circulation of the rollers, and said inwardly inclined projected portions having an outer non-loading stepped part and an inner loading stepped part, while having curved end parts at both the front and rear ends thereof, a track shaft adapted to be slidably fitted into said considerably large groove in the bearing unit body, an upper retainer fixedly mounted on the flat portion of the bearing unit body for covering the non-loading rollers, side retainers fixedly mounted on the projected portions of the same for carrying the non-loading rollers along the outer stepped parts, and a number of rollers adapted to circulate through the upper and lower roller grooves as well as along the inner and outer stepped parts, wherein a plurality of threaded holes are provided outside the upper roller groove on the flat portion of the bearing unit body in a symmetrical relation so that a corresponding number of tightening bolts are screwed thereinto through drilled holes of the moving member in such a manner that among said bolts outer ones are first scrwed and then the residual inner ones are screwed more tightly than the former, whereby the bearing unit body is prestressed or preloaded.

9. A method of mounting a roller bearing unit on a machine table with a moving member mounted thereon as defined in claim 8, wherein there is provided a certain clearance between the upper surface of the flat portion of the bearing unit body and the bottom surface of the moving member.

* * * * *

UNITED STATES PATENT AND TRADEMARK OFFICE
CERTIFICATE OF CORRECTION

PATENT NO.  : 4,396,235
DATED       : August 2, 1983
INVENTOR(S) : Hiroshi Teramachi It is certified that error appears in the above-identified patent and that said Letters Patent is hereby corrected as shown below:

On the title page insert:

-- /30/  Foreign Application Priority Data

Dec. 12, 1980  Japan..........55-174576  --.

Signed and Sealed this

Twenty-third Day of April 1985

[SEAL]

*Attest:*

DONALD J. QUIGG

*Attesting Officer*      *Acting Commissioner of Patents and Trademarks*